United States Patent [19]

Doman

[11] Patent Number: 4,549,624
[45] Date of Patent: Oct. 29, 1985

[54] WHEELCHAIR DIRECTION CONTROL MEANS

[75] Inventor: Herbert M. Doman, Ventura, Calif.

[73] Assignee: Everest & Jennings, Inc., Camarillo, Calif.

[21] Appl. No.: 660,074

[22] Filed: Oct. 12, 1984

[51] Int. Cl.$^4$ .............................................. B62D 11/00
[52] U.S. Cl. .................................... 180/6.28; 180/6.5; 318/587
[58] Field of Search .............. 280/211; 180/6.28, 6.48, 180/6.5, 907; 318/648, 587

[56] References Cited

U.S. PATENT DOCUMENTS

| | | | |
|---|---|---|---|
| 2,905,878 | 9/1959 | Olson | 318/587 |
| 3,756,335 | 9/1973 | Elsele et al. | 180/6.28 |
| 3,814,199 | 6/1974 | Jones | 318/587 |

Primary Examiner—William E. Wayner
Attorney, Agent, or Firm—Pastoriza & Kelly

[57] ABSTRACT

A third caster wheel is mounted between the main wheels of a power wheelchair to engage the terrain over which the wheelchair travels. Turning of the wheelchair from a straight line course as a result of uneven terrain is immediately corrected by initially sensing the turning with the third caster wheel. A signal responsive to turning of the caster wheel stem is fed to the left and right wheelchair drive motors to increase the speed of one and decrease the speed of the other so as to return the wheelchair to its straight line course. The caster wheel sensing and feedback system is disabled when an intentional turning of the wheelchair is carried out with the conventional joy stick.

7 Claims, 6 Drawing Figures

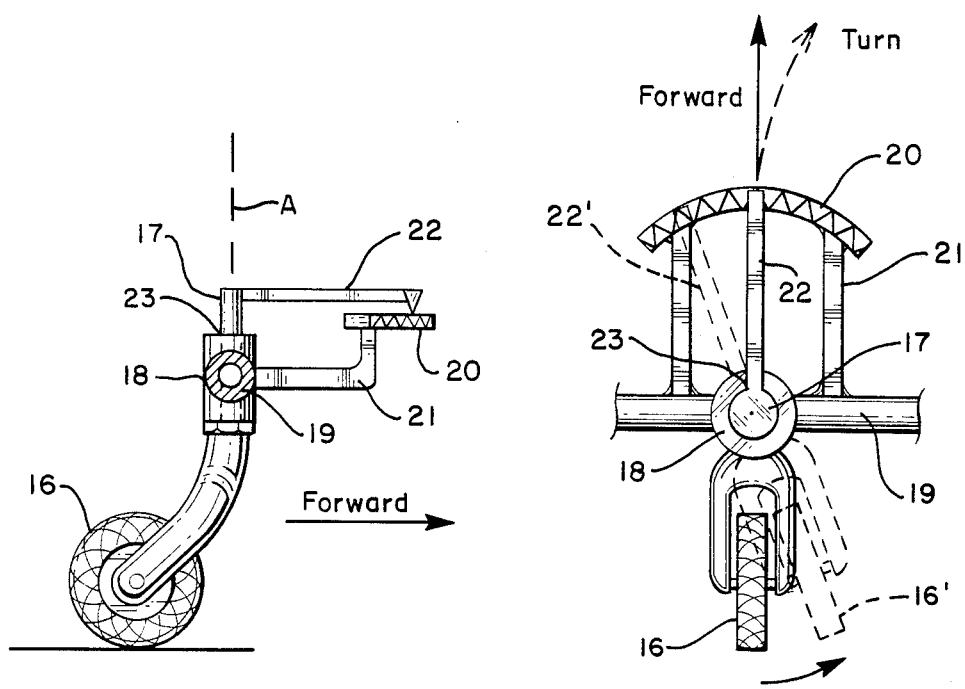
FIG. 4
FIG. 5
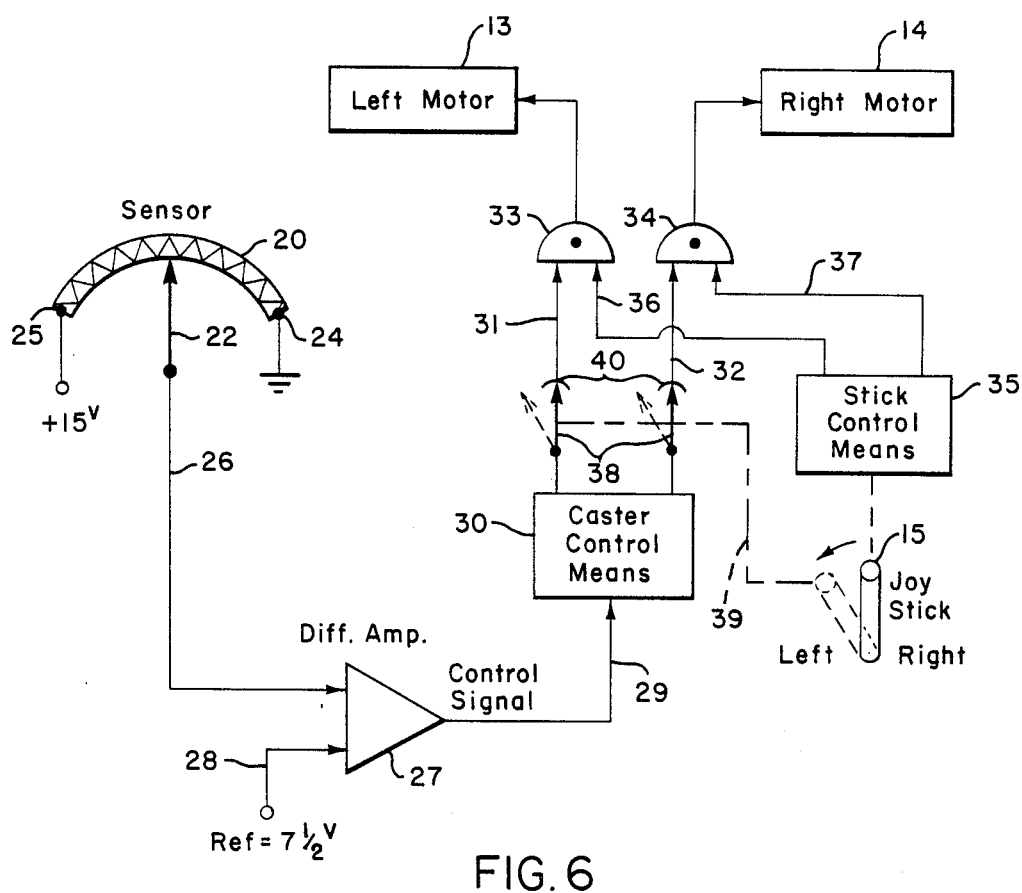
FIG. 6

WHEELCHAIR DIRECTION CONTROL MEANS

FIELD OF THE INVENTION

This invention relates generally to wheelchairs and more particularly to a control means for automatically maintaining a wheelchair on a straight line course when traveling over uneven terrain.

BACKGROUND OF THE INVENTION

Most conventional power wheelchairs include left and right drive motors respectively connected to the left and right main wheels of the chair. A joy stick is provided as a control means, pivoting of the joy stick to the left causing the left motor to slow and the right motor to speed up and thereby turn the chair to the left. Pivoting of the joy stick to the right causes the right motor to slow and left motor to speed up to turn the chair to the right. Forward movement of the stick moves the chair forward at a speed generally proportional to the stick movement, ane rearward movement of the stick will reverse the motors to cause rearward movement of the chair.

It is desirable that the chair maintain a straight line course when the joy stick is in a centerline position; i.e., not tilted to the left or right. Normally, straight line tracking is accomplished by assuring that the left and right motors are turning at the exact same speeds. Maintaining identical speeds in turn can be accomplished by tachometer feedback circuits wherein an error signal is generated in response to any difference in the left and right motor rpm's and used to eliminate the difference.

While the foregoing controls will theoretically assure a straight line course for flat, even terrain, should there be any deviation of the terrain from a smooth flat surface, a turning of the wheelchair can result even though the main wheels are turning at the same rpm. For example, if a level surface changes to a surface sloping from the left side downwardly towards the right side, the right wheel will have to execute more rpm's than the left wheel while passing over the transition from the level surface to the sloping surface in order to keep the wheelchair on a straight course. It can be seen, accordingly, that simply maintaining identical speeds for the left and right wheels will not necessarily assure travel of the wheelchair in a straight line when the terrain is uneven.

BRIEF SUMMARY OF THE INVENTION

With the foregoing in mind, the present invention contemplates the provision of a wheelchair direction control means for maintaining the wheelchair on a straight line course notwithstanding the terrain may be uneven.

More particularly, in its broadest aspect, the control includes a caster wheel having a stem rotatably mounted on the wheelchair. This caster wheel engages the terrain over which the chair travels. Means are provided responsive to turning of the caster wheel stem as a result of turning of the wheelchair from a straight line course due to uneven terrain, connected to the power steering means for the chair to turn the chair back to its original straight line course.

BRIEF DESCRIPTION OF THE DRAWINGS

A better understanding of this invention will be had by referring to the accompanying drawings, in which:

FIG. 4 is a side elevational view of a portion of the direction control means looking in the direction of the arrow 4 of FIG. 2; FIG. 5 is plan view of the control means shown in FIG. 4 taken in the direction of the arrows 5—5 of FIG. 2; and, FIG. 6 is a simplified schematic diagram of one type of control means in accord with the present invention.

DETAILED DESCRIPTION OF THE INVENTION

Figure 1:
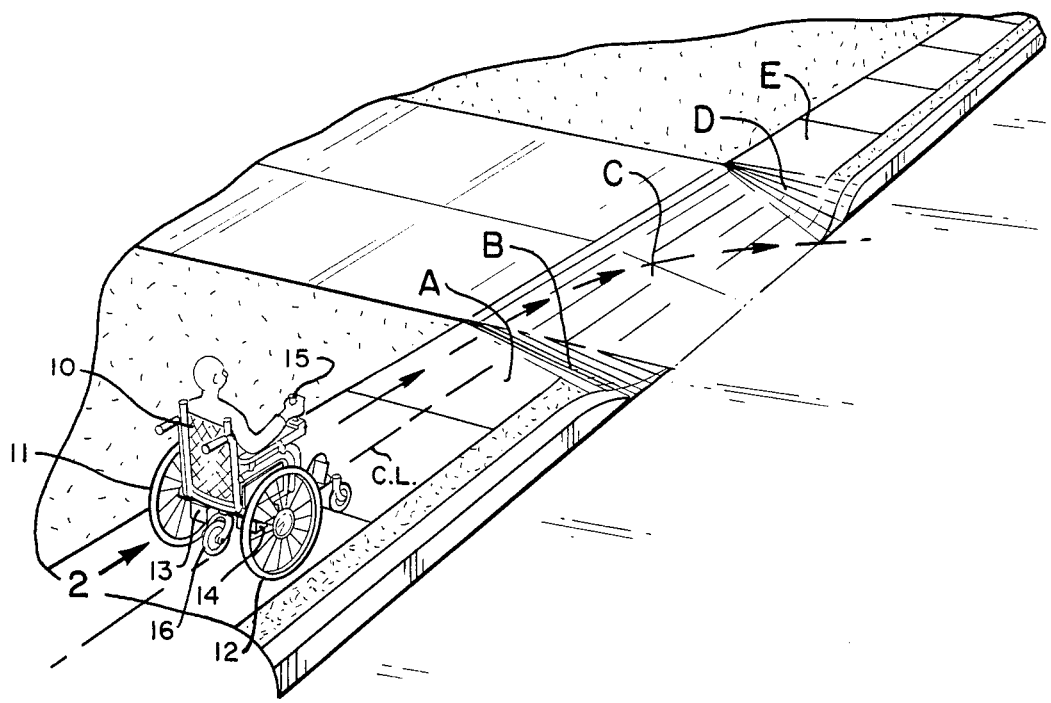
FIG. 1 is a perspective view of a power wheelchair equipped with the direction control means of this invention, the wheelchair being shown traveling along a sidewalk towards a driveway.

Referring first to FIG. 1, there is shown a power wheelchair 10 having left and right main wheels 11 and 12 driven by left and right drive motors 13 and 14 respectively. As briefly described heretofore with respect to power wheelchairs, there is provided a joy stick 15 for controlling the steering, forward and reaward movement of the chair.

In accord with the present invention, there is provided a caster wheel 16 preferably positioned along a centerline C.L. midway between the left and right main wheels 13 and 14 for engaging the terrain over which the wheelchair 10 passes. While one of the front caster wheels already available on the wheelchair could be used and appropriately modified to carry out the present invention, it is preferable to provide a third caster wheel centrally positioned as shown.

In FIG. 1, the wheelchair 10 is shown on the surface A of a sidewalk. This sidewalk merges at B into a sloping surface C constituting the entrance of a driveway. The far side of the sloping surface C merges at D into a flat sidewalk surface again as at E.

The above described uneven terrain is typically found whenever a driveway crosses a sidewalk from the street and in the case of conventional wheelchairs, will result in a turning of the wheelchair outwards towards the street as indicated by the arrows in FIG. 1. This turning will take place even if means are provided for maintaining the speeds of the left and right wheels identical. The slope from left to right in FIG. 1 defines a longer path for the right wheel than the left wheel if the chair is to remain on a straight line course. Therefore, a slight speeding up of the right wheel relative to the left, or a slight slowing down of the left relative to the right is required to avoid the wheelchair following the turning path shown by the arrows. It will be understood that the change in relative speeds of the wheels is only necessary at the transition surfaces B and D. When the chair is on the flat surface A or E as in FIG. 2 or completely on the sloping surface C as in FIG. 3, it will stay on a straight line course so long as the wheels rotate at equal speeds.

Figure 2:
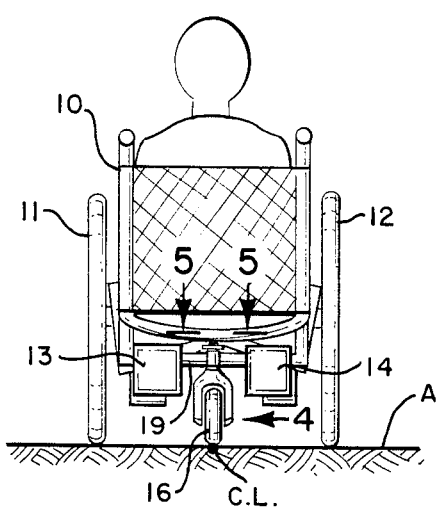
FIG. 2 is a rear elevational view of the wheelchair looking in the direction of the arrow 2 of FIG. 1.
Figure 3:
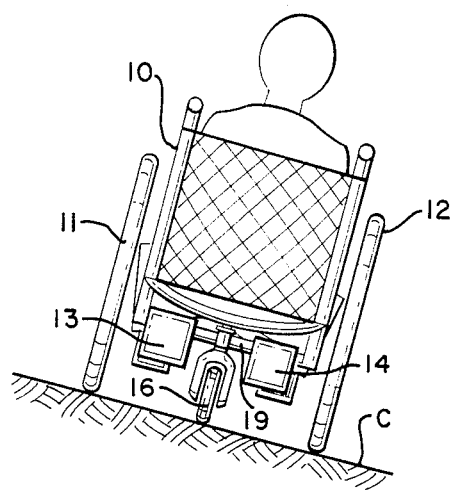
FIG. 3 is a view similar to FIG. 2 showing the wheelchair when traveling over a sloping surface constituting the entrance area of the driveway.

FIG. 4 shows the caster wheel 16 from the side looking in the direction of the arrow 4 of FIG. 2. The caster wheel stem is shown at 17 and is vertically mounted by journal 18 to a frame portion 19 of the wheelchair. So long as the wheelchair is traveling in a straight line course, the caster wheel 16 and stem 17 will remain in a centered position. Any turning of the wheelchair independently of the manner in which the wheels rotate will result in a turning of the caster wheel 16 causing rotation of its stem 17 in the journal 18. By sensing this rotation a signal can be generated to turn the wheelchair back on to a straight line course. When this course is achieved, the caster wheel and stem will return to its centered position and the correcting signal will no longer be generated.

One type of sensing means for generating a control signal in response to turning of the caster wheel stem might constitute a simple potentiometer resistance and wiper arm. In FIGS. 4 and 5 such potentiometer resistance is shown at 20 secured in a fixed position as by mounting bracket 21 to the wheelchair. A wiper arm 22, in turn, is secured at one end to the upper end of the caster wheel stem 17 as at 23. The far end is free and makes electrical contact with potentiometer resistance 20.

FIG. 5 shows the caster wheel and wiper arm 22 in plan wherein it will be noted that turning of the caster wheel 16 to the phantom line position shown at 16' as a result of a turning of the wheelchair to the right will result in the wiper arm moving from its center position on the resistance to phantom line position 22'.

Referring to FIG. 6, one end of the potentiometer resistance 20 is grounded as at 24 and the other end connected at 25 to a positive voltage source; e.g. +15 volts. When the wiper arm 22 is in a centered position as shown, it will tap off 7½ volts and this signal is passed via lead 26 to a first input of a differential amplifier 27. A reference voltage 28 is connected to the second input as shown. By making the reference voltage the same as the signal on lead 26 when the wiper is in a centered position, the inputs to the differential amplifier will be equal and there will be no output signal or "difference" signal. If the wiper arm moves off center to the left or right, there will then be generated an error signal at the output of the differential amplifier.

The above described error signal is utilized as a control signal and is passed via lead 29 to a control means 30. Control means 30 connects to the left and right drive motors 13 and 14 by way of leads 31 and 32 passing to first inputs of OR circuits 33 and 34 respectively. The second inputs of the OR circuits receive signals from a control means 35 operated by the joy stick 15 by way of leads 36 and 37.

The circuit of FIG. 6 is completed by provision of an appropriate means to disable the control means 30 when the joy stick 15 is intentionally moved to the left or right to steer the wheelchair. This means comprises cut-out switches 38 ganged for movement to an open position by the joy stick 15 as indicated by the dot-dashed line 39. Switch contacts for the switch arms 38 are shown at 40 and are elongated slightly so that a movement of the joy stick beyond a given degree is necessary to disconnect the control means 30 from the left and right motors.

OPERATION

The operation of this invention will be evident from the foregoing description. Referring to FIG. 1, with the caster wheel 16 attached to the chair as described, when the chair passes over the transition surface B, the resulting turning as described heretofore results in a turning of the caster wheel stem thereby immediately generating a signal from the differential amplifier 27. This signal will have a polarity determined by the direction of turning; i.e. to the right or left. The error or control signal will pass through the control means 30 and OR circuits to the left and right drive motors and will change the speed of one motor relative to the other in a manner to turn the wheelchair back to a straight line course. When a straight line course is reached, the caster wheel 16 returns to its centered position thereby reducing the feedback signal or control signal from the amplifier to zero.

It will be understood that the foregoing sequence is carried out very quickly and very little turning movement of the wheelchair actually occurs. In other words, the servo feedback loop functions with a rapid response time so that the wheelchair is maintained on its straight line course notwithstanding the uneven terrain.

When the chair reaches the far transition surface D, the resulting turning of the wheelchair will again be immediately corrected. Of course, if the patient wishes to intentionally turn the chair, he or she will utilize the joy stick in a conventional manner, the sensing circuit being cut-out as described. The sensing circuit thus operates only when the joy stick is substantially in its center position with respect to the left and right directions.

From all of the foregoing, it will now be evident that the present invention has provided a greatly improved wheelchair direction control means which not only eliminates the need for tachometer feedback type controls but performs better over uneven terrain.

Changes falling within the scope and spirit of this invention will occur to those skilled in the art. The direction control means is therefore not to be thought of as limited to the specific example set forth for illustrative purposes. For example, while the control signal has been illustrated as connecting to both the left and right drive motors to speed one up and slow one down in correcting a turn, it is possible to simply change the speed of at least one of the motors.

I claim:

1. In a wheelchair including moving and steering power means,
    (a) a caster wheel having a stem rotatably mounted on said wheelchair, said caster wheel engaging the terrain over which the chair travels; and
    (b) means responsive to turning of the caster wheel stem as a result of turning of the wheelchair from a straight line course due to uneven terrain, connected to the power steering means to turn the chair back to its original straight line course.

2. The subject matter of claim 1, in which said wheelchair includes left and right main wheels, said caster stem being mounted on a centerline midway between said wheels.

3. The subject matter of claim 1, in which said wheelchair includes a joy stick for controlling power to said wheels, and means responsive to movement of said joy stick in a turning direction beyond a given degree for disconnecing said means responsive to turning of the caster wheel stem from said power steering means.

4. In a wheelchair having left and right main wheels driven by left and right drive motors and wherein a joy stick is provided for speeding up one motor and slowing down the other when it is desired to turn the wheelchair, a wheelchair directional control means for automatically maintaining the direction of the wheelchair on a straight line course even through the terrain may be uneven, said control means including, in combination:
    (a) a caster wheel having a vertical stem mounted on the wheelchair, said caster wheel engaging the terrain over which the wheelchair is traveling;

(b) sensing means in said wheelchair for generating a control signal in response to rotation of said stem from a center position in which said caster wheel is aligned in a straight ahead direction, said stem rotating as a result of turning of the wheelchair when traveling over uneven terrain; and, (c) control means connected to said left and right drive motors and responsive to said control signal to change the speed of at least one motor so as to turn back the wheelchair to a straight line course, said caster wheel returning to its center position when the wheelchair is traveling in a straight line to thereby remove said control signal.

5. A wheelchair according to claim 4, in which said caster wheel is positioned along a centerline midway between said left and right main wheels.

6. A wheelchair according to claim 4, including means responsive to movement of said joy stick in a turning direction beyond a given degree for disabling said control means from affecting said left and right motors.

7. A wheelchair according to claim 4, in which said control signal is proportional to the degree of turning of the wheelchair.

* * * * *